(12) United States Patent
Feigel

(10) Patent No.: US 7,798,173 B2
(45) Date of Patent: Sep. 21, 2010

(54) ELECTRICALLY CONTROLLABLE VALVE

(75) Inventor: Hans-Jörg Feigel, Rosbach (DE)

(73) Assignee: Continental Teves, Inc., Auburn Hills, MI (US)

( * ) Notice: Subject to any disclaimer, the term of this patent is extended or adjusted under 35 U.S.C. 154(b) by 886 days.

(21) Appl. No.: 11/629,120

(22) PCT Filed: Jun. 2, 2005

(86) PCT No.: PCT/EP2005/052516

§ 371 (c)(1),
(2), (4) Date: Dec. 8, 2006

(87) PCT Pub. No.: WO2005/121918

PCT Pub. Date: Dec. 22, 2005

(65) Prior Publication Data

US 2008/0283135 A1    Nov. 20, 2008

(30) Foreign Application Priority Data

Jun. 8, 2004    (DE)    ........................ 10 2004 027 785
Mar. 29, 2005    (DE)    ........................ 10 2005 014 101

(51) Int. Cl.
*F16K 39/02*    (2006.01)
(52) U.S. Cl. .............................. 137/630.14; 137/627.5; 137/630.22
(58) Field of Classification Search ............ 137/625.28, 137/625.33, 625.48, 627.5, 628, 630.14, 137/630.22, 614, 614.11, 614.2
See application file for complete search history.

(56) References Cited

U.S. PATENT DOCUMENTS

| | | | | | |
|---|---|---|---|---|---|
| 628,671 | A | * | 7/1899 | Newman | 137/630.14 |
| 702,383 | A | * | 6/1902 | Tyson | 137/630.22 |
| 1,020,535 | A | * | 3/1912 | Brenner | 137/630.14 |
| 1,161,095 | A | * | 11/1915 | Westinghouse | 137/630.22 |
| 1,397,251 | A | * | 11/1921 | Haines | 137/630.22 |
| 4,437,830 | A | * | 3/1984 | Harris et al. | 137/628 |
| 4,452,267 | A | * | 6/1984 | Ott et al. | 137/116.5 |
| 5,325,830 | A | | 7/1994 | Hammer | |
| 5,577,815 | A | * | 11/1996 | Hashida | 137/627.5 |
| 5,609,400 | A | * | 3/1997 | Hashida | 137/627.5 |
| 5,975,654 | A | | 11/1999 | Zaviska et al. | |
| 2002/0053362 | A1 | | 5/2002 | Frei et al. | |

FOREIGN PATENT DOCUMENTS

| | | |
|---|---|---|
| DE | 3412351 | 10/1985 |
| DE | 4426152 | 3/1996 |
| DE | 69401887 | 7/1997 |
| DE | 19711289 | 9/1998 |
| DE | 19954616 | 7/2002 |

* cited by examiner

*Primary Examiner*—Stephen Hepperle
*Assistant Examiner*—Craig Price

(57) ABSTRACT

Disclosed is an electrically controllable valve accommodating in its valve housing (4) a second valve member (6) that is operable by the first valve member (2) in order to be able to variably adjust a second valve opening cross-section (A2) that is arranged in series to the first valve opening cross-section (A1), and a third valve opening cross-section (A3) that is releasable by means of the first valve member (2) is positioned in series arrangement to the first valve opening cross-section (A1) in order to limit the hydraulic pressure to a mechanically preset value.

2 Claims, 2 Drawing Sheets

ELECTRICALLY CONTROLLABLE VALVE

BACKGROUND OF THE INVENTION

The present invention relates to an electrically controllable valve, in particular for use in a shock absorber, including an actuator and a first valve member operable by the actuator and cooperating with a valve seat (control edge) in the valve housing in order to variably adjust a first valve opening cross-section.

DE 44 27 905 A1 discloses an electrically controllable valve, including an actuator, a first valve member operable by the actuator and cooperating with a valve seat (control edge) in the valve housing in order to be able to variably adjust a first valve opening cross-section.

An object of the invention is to configure a valve of the indicated type with least possible effort in such a fashion that a pressure controlling and pressure limiting function is achieved by using simple, functionally reliable means.

SUMMARY OF THE INVENTION

According to the invention, this object is achieved for a solenoid valve of the type at issue by an electrically operable valve, including an actuator, a first valve member operable by the actuator and cooperating with a valve seat (control edge) in the valve housing in order to variably adjust a first valve opening cross-section. A second valve member (6) operable by the first valve member (2) is arranged in the valve housing (4) in order to variably adjust a second valve opening cross-section (A2) that is arranged in series to the first valve opening cross-section (A1), and a third valve opening cross-section (A3) that is releasable by means of the first valve member (2) is positioned in series arrangement to the first valve opening cross-section (A1) for limiting the hydraulic pressure to a mechanically preset value.

Further features, advantages, and possible applications of the invention can be seen in the subsequent description of an embodiment for a valve in different operating positions.

DETAILED DESCRIPTION OF THE DRAWINGS

Figure 1A:
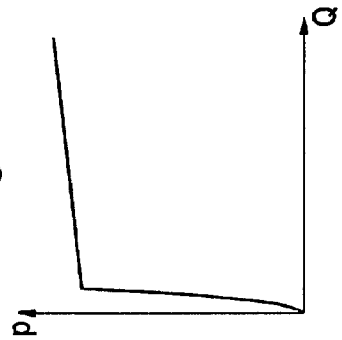
FIG. 1 is a longitudinal cross-section taken through a valve with the features on which the invention is based in a first pressure control position, in which the exciting current corresponds to the maximum electric actuating current of the valve coil, with the result that the desired fluid flow penetrates the valve under high fluid pressure.
Figure 1:
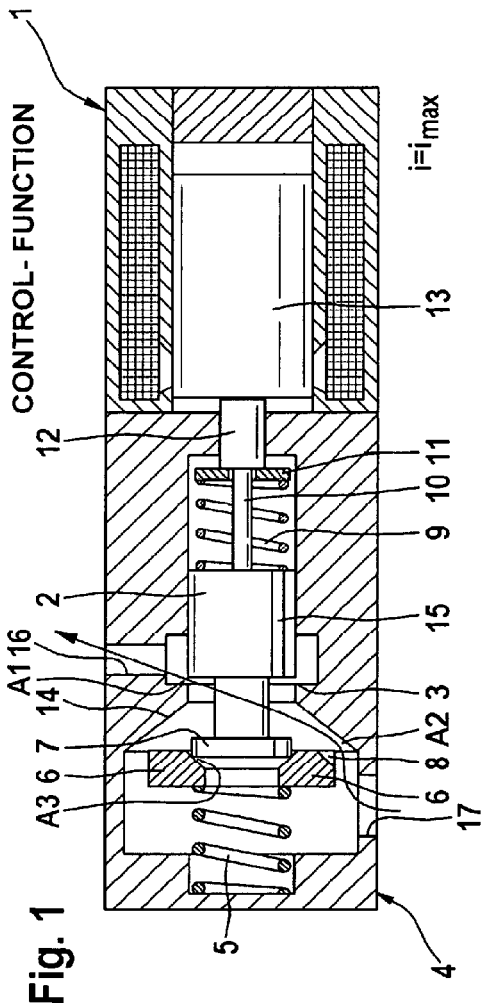

Initially, the principal design of the valve shall be described exemplarily for all illustrations by way of FIG. 1.

FIG. 1 shows a longitudinal cross-sectional view of an electrically operable valve, which is preferably used for controlling a shock absorber in a motor vehicle. The valve comprises an electric actuator 1, a first valve member 2 that is directly operable by the actuator 1 and cooperates with a control edge 3 in the valve housing 4. The cooperation of the first valve member 2 with the control edge 3 using the actuator 1 achieves a variably adjustable first valve opening cross-section A1, through which a controlled fluid flow (so-called primary flow) propagates in the direction of the valve outlet channel 16 that is disposed in the area of the valve member 2.

Besides, a second valve opening cross-section A2 is arranged in front of the first valve opening cross-section A1 between the conically expanded inside portion of the valve housing 4 and an annular-disc-shaped second valve member 6, which is to be actuated by the actuator 1 by way of a tappet-shaped extension 7 that is fitted at the first valve member 2 and the outside diameter of which corresponds to the outside diameter of the first valve member 2. The variable second valve opening cross-section A2 is thus positioned upstream of the first valve opening cross-section A1 in series connection with the first valve opening cross-section A1, and both valve opening cross-sections A1, A2 can be opened and closed reciprocally proportional to each other by means of the first valve member 2.

Further, a third valve cross-section A3, which is normally closed by the end face of the extension 7, is provided in the second valve member 6. For closing the second valve opening cross-section A2, the second valve member 6 is configured as an annular-disc-shaped seat valve member, which is movable into abutment on a housing step 14 (conical step of the valve housing 4). A valve inlet channel 17 opens into the valve housing 4 upstream of the second valve member 6.

The first valve member 2 in the area of the first valve opening cross-section A1 is preferably designed as valve piston guided in the valve housing 4, which, in the electrically de-energized condition of the actuator 1, is always lifted from the control edge 3 by means of a resetting spring 5 that acts on the second valve member 6 so that the first valve opening cross-section A1 is opened at least in part. In addition, this provides a hydraulic connection between the valve outlet channel and valve inlet channel 16, 17 through the aperture 8 at the second valve member 6.

The resetting spring 5 is arranged between the second valve member 6 and the valve housing 4 so that, in the non-energized condition of the actuator 1, the second valve member 6 is always in sealing abutment on the housing step 14 (conical step of the valve housing 4), and exclusively the aperture 8 of the second valve member 6 is released, which aperture is designed as a circumferential notch in the embodiment at issue, so that, in the non-energized condition of the actuator 1, an insignificant passage exists in the area of the third valve opening cross-section A3 in order to safeguard the hydraulic connection between the valve inlet and outlet channels 17, 16, which connection is dependent on the cross-section of the aperture 8.

Further, a compression spring 9 is interposed between the first valve member 2 and a spring stop 11 arranged between the actuator 1 and the valve member 2, said spring counteracting only weakly the hydraulic pressure in the valve inlet channel 17 and the resetting spring 5. To accommodate and guide the compression spring 9 and the disc-shaped spring stop 11, the first valve member 2 includes an actuating pin 10 on its end face remote from the extension 7. Under the permanent effect of the compression spring 9, the spring stop 11 either is supported on the inside wall of the valve housing 4 or on a stop shoulder of a thrust member 12 connected to the actuating pin 10. The thrust member 12 is sealed within the valve housing 4 and, in a preferred embodiment, projects with its end face remote from the spring stop 11 into the electromagnetic actuator 1, which is composed of an armature 13 that actuates the thrust member 12.

If desired or required, the first valve member 2 may of course be configured as a seat valve rather than as a slide valve. When the valve member 2 is designed as a plunger piston guided in the valve housing 4, a pressure distributor groove 15 is preferably disposed at the outside periphery of the plunger piston, through which the fluid propagates for pressure balance into the space of the valve housing 4 in which the compression spring 9 is disposed. Sealing of this space in the direction of the actuator takes place in the simplest case by way of the metallically sealing thrust member 12, which is inevitably acted upon by fluid pressure as well.

Subsequently, the different valve positions and the associated pressure variations shall now be indicated exemplarily by way of FIGS. 1 to 4.

FIG. 1 shows the valve with the features on which the invention is based in a first pressure control position, in which the exciting current corresponds to the maximum electric actuating current of the valve coil fitted to the valve housing 4, with the result that the adjusted fluid flow can penetrate the valve in one direction under high fluid pressure. Due to the maximum exciting current $i_{max}$, the armature 13 displaces the assembly comprising the thrust member 12, the spring stop 11, the compression spring 9, the first and second valve pistons 2, 6, and the extension 7 in opposition to the resetting spring 5 to the left, with the result that the second valve piston 6 moves away from the housing step 14, while the first valve piston 2 approaches the control edge 3 for pressure control.

FIG. 1a shows the pressure control characteristic curve for the pressure control function illustrated in FIG. 1. To this end, the pressure rise p is plotted on the ordinate of the diagram in FIG. 1a, while the volume flow Q is plotted along the abscissa, indicating that due to the high exciting current $i_{max}$, the desired high volume flow Q of the fluid is characterized by a steep pressure rise p of the hydraulic pressure.

Figure 2A:
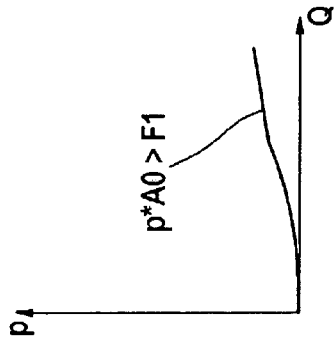
FIG. 2 shows the valve according to FIG. 1 in a second pressure control position, in which the exciting current corresponds to the minimum electric actuating current, with the result that the fluid flow penetrates the valve under low fluid pressure.
Figure 2:
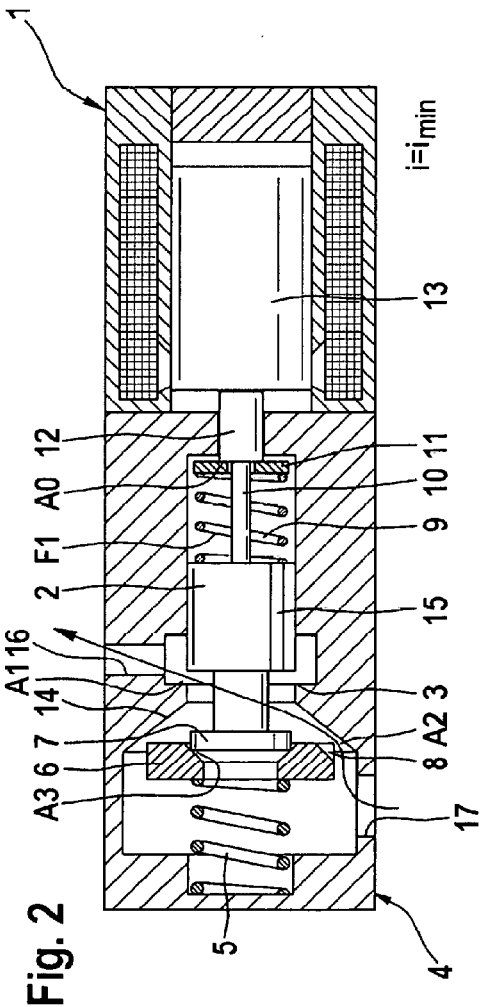
Figure 3A:
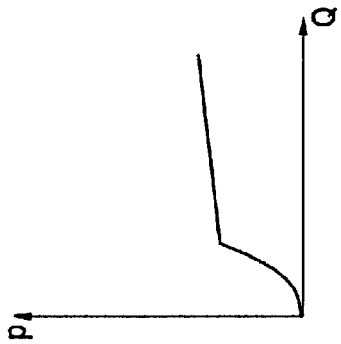
FIG. 3 shows the valve according to FIG. 1 in a first fail-safe position, in which the valve is not actuated or not actuatable electrically (exciting current I=0), and a (second) valve opening cross-section having an aperture is released for pressure control.

Different from FIG. 1, FIG. 2 shows the valve in a control position, in which the exciting current corresponds to the minimum electric actuating current of the valve coil 12. Caused by the minimum exciting current $i_{min}$, the armature 13 displaces the assembly composed of the thrust member 12, the spring stop 11, the compression spring 9, the first and second valve piston 2, and the extension 7 only insignificantly to the left in opposition to the effect of the resetting spring 5, with the result that the second valve piston 6 moves only insignificantly away from the housing step 14, while for pressure control the first valve piston 2 approaches the control edge 3 by the amount of travel covered by the second valve piston 6. Hence, the pressure control characteristic curve illustrated in the diagram according to FIG. 2a is accomplished in this pressure control position, and a flat pressure rise with increasing volume flow Q can be taken from said curve.

Figure 3:
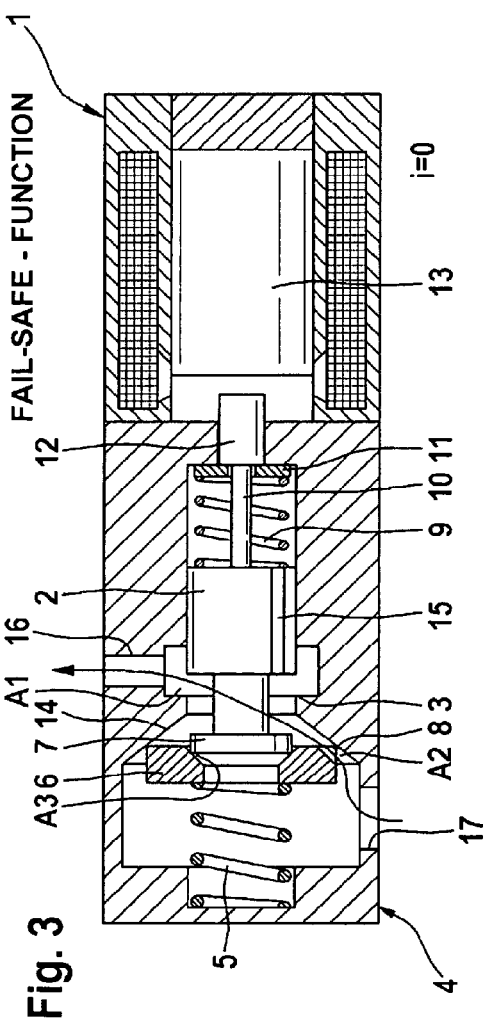

FIG. 3 shows the valve in a first fail-safe position in which the valve is not actuated or actuatable electrically (exciting current I=0) and in which the second valve opening cross-section A1 is quasi closed except for the leakage through the aperture 8. In this arrangement, the armature 13 remains in its position remote from the thrust member 12, with the result that the second valve member 6 bears against the housing step 14 that forms the valve seat, due to the effect of the resetting spring 5. As the first valve member 2 is supported on the front face of the second valve member 6 remote from the resetting spring 5, the first valve member 2 automatically moves way from the control edge 3 by the dimension, which corresponds to the closure travel of the second valve member 6. Consequently, an insignificant fluid flow propagates exclusively through the aperture 8 to the open first valve opening cross-section A1, from which results the course of characteristic curve that is characteristic of the aperture effect.

Figure 4A:
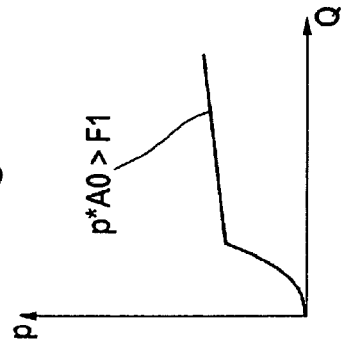
FIG. 4 shows the valve according to FIG. 1 in a second fail-safe position, in which the valve is not actuated or not actuatable electrically (exciting current I=0), and first, second, and third valve opening cross-sections are released until pressure limitation to a desired, invariably adjusted pressure level.
Figure 4:
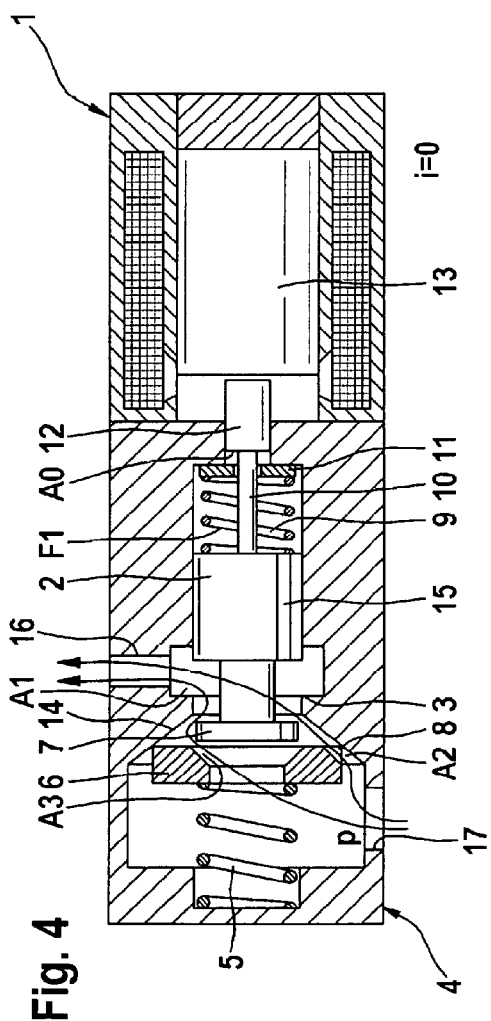

Based on the illustration of FIG. 3, FIG. 4 shows the valve in a so-called second fail-safe position, which differs from the first fail-safe position shown in FIG. 3 in that the hydraulic inlet pressure that acts on the end face of the extension 7 lifts the extension 7 from its seat surface on the second valve member 6, whereby the third valve opening cross-section A3 between the extension 7 and the second valve member 6 is released, through which a secondary fluid flow is conducted to the first valve opening cross-section A1 and from there to the valve outlet channel 16 in parallel to the primary fluid flow that enters via the aperture 8 in a throttled fashion. Compressed by the compression spring 9, the thrust member 12 is positioned shortly in front of the armature 13 in this valve position. The force F1 of the compression spring 9 is thus rated smaller than the hydraulic force that results from the hydraulic pressure p and the end face A0 at the thrust member 12. Compression spring 9 has a lower rate of spring rigidity compared to the resetting spring 5.

Corresponding to the diagram according to FIG. 4a, a pressure limiting function develops, which is basically set due to the constructive layout of the first valve piston 2 and the compression spring 9 and in which the secondary fluid flow of the second valve piston 6 passes through the latter's open third valve opening cross-section A3 in parallel to the primary flow through the aperture 8. Due to the hydraulic displacement of the extension 7 in the direction of the housing step 14, the fluid propagates through the second valve opening cross-section A2 in a throttled fashion to the first, un-throttled valve opening cross-section A1, with the valve outlet channel 16 being connected thereafter.

The two valve members 2, 6 are suitably configured in such a way that the flow forces that develop in the passage are balanced to a great extent.

LIST OF REFERENCE NUMERALS 1 actuator
2 first valve member
3 control edge
4 valve housing
5 resetting spring
6 second valve member
7 extension
8 aperture
9 compression spring
10 actuating pin
11 spring stop
12 thrust member
13 armature
14 housing step
15 pressure distributor groove
16 valve outlet channel
17 valve inlet channel
A1 first valve opening cross-section
A2 second valve opening cross-section
A3 third valve opening cross-section

The invention claimed is:

1. An electrically operable valve comprising:

an actuator;

a first valve member operable by the actuator and cooperating with a valve seat in a valve housing in order to variably adjust a first valve opening cross-section;

a second valve member (6) operable by the first valve member (2) is arranged in the valve housing (4) in order to variably adjust a second valve opening cross-section (A2) that is arranged in series to the first valve opening cross-section (A1);

a third valve opening cross-section (A3) that is releasable by means of the first valve member (2) is positioned in series arrangement to the first valve opening cross-section (A1) for limiting the hydraulic pressure to a mechanically preset value wherein the first valve member (2) is designed as a valve piston, which is guided in the valve housing (4) and on an end surface of which remote from the second valve member (6), an actuating in (10) with a piston-shaped thrust member (12) is mounted, that projects in a fluid-tight manner from the valve housing (4) in the direction of the actuator (1) wherein at least for the basic positioning of the first valve member (2), a compression spring (9) is arranged in the valve housing (4) between the thrust member (12) and the first valve member (2), said spring is supported on a spring stop (11) that is relatively displaceably arranged on the actuating pin (10) between the thrust member (12) and the first valve member (2) for realizing the mechanically preset pressure limiting function.

2. A valve according to claim 1, wherein the compression spring (9) has a lower rate of spring rigidity compared to the resetting spring (5).

* * * * *